(12) United States Patent
Goerge et al.

(10) Patent No.: US 8,514,725 B2
(45) Date of Patent: Aug. 20, 2013

(54) OPERATING NETWORK ENTITIES IN A COMMUNICATIONS SYSTEM

(75) Inventors: Juergen Goerge, Neuried (DE); Olaf Pollakowski, Berlin (DE); Henning Sanneck, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 12/449,056

(22) PCT Filed: Jan. 21, 2008

(86) PCT No.: PCT/EP2008/050609
§ 371 (c)(1),
(2), (4) Date: Oct. 7, 2009

(87) PCT Pub. No.: WO2008/090110
PCT Pub. Date: Jul. 31, 2008

(65) Prior Publication Data
US 2010/0046379 A1  Feb. 25, 2010

(30) Foreign Application Priority Data
Jan. 22, 2007 (EP) ..................... 07001292

(51) Int. Cl.
*H04L 12/26* (2006.01)
(52) U.S. Cl.
USPC ........ 370/242; 370/241.1; 370/248; 370/216; 370/331

(58) Field of Classification Search
USPC .............. 370/241.1, 242, 216, 270; 709/223, 709/224
See application file for complete search history.

(56) References Cited

U.S. PATENT DOCUMENTS

| | | | | |
|---|---|---|---|---|
| 2005/0192011 A1* | 9/2005 | Hong et al. | ................... | 455/440 |
| 2006/0020686 A1* | 1/2006 | Liss et al. | ...................... | 709/219 |
| 2006/0045007 A1* | 3/2006 | Huck | ............................ | 370/226 |
| 2006/0092935 A1* | 5/2006 | Lakshman et al. | ............ | 370/389 |
| 2006/0240833 A1* | 10/2006 | Kwon et al. | ................... | 455/440 |
| 2007/0189509 A1* | 8/2007 | Foody et al. | ...................... | 380/2 |
| 2007/0190950 A1* | 8/2007 | Madhavan et al. | .............. | 455/99 |
| 2010/0178920 A1* | 7/2010 | Kitazoe et al. | ................ | 455/436 |

OTHER PUBLICATIONS

M. Post et al.; "The Manager/Agency Paradigm for Distributed Network Management"; 1996 IEEE Network Operations and Management Symposium (NOMS), 1996; vol. 1 Symp. 5, pp. 44-53.
International Search Report for Application No. PCT/EP2008/050609; mailed Mar. 14, 2008.

* cited by examiner

Primary Examiner — Rasheed Gidado
(74) Attorney, Agent, or Firm — Staas & Halsey LLP (57) ABSTRACT

Network entities in a communications system include one hierarchical level of a management network of the communications system, where fault and/or performance management related data is sent. A first network entity sends such data to at least one second network entity after the at least one second network entity is determined based on a configuration management relationship with the first network entity.

22 Claims, 5 Drawing Sheets

OPERATING NETWORK ENTITIES IN A COMMUNICATIONS SYSTEM

CROSS REFERENCE TO RELATED APPLICATIONS

This application is the U.S. national stage of International Application No. PCT/EP2008/050609, filed Jan. 21, 2008 and claims the benefit thereof. The International Application claims the benefits of European Application No. 07001292 filed on Jan. 22, 2007, both applications are incorporated by reference herein in their entirety.

BACKGROUND

Described below is a method of operating network entities in a communications system, in particular in a communications system having a management network with at least one hierarchical level for a management of the communications system. Additionally, described below is a computer program implementing the above mentioned method. Further, the network entities in a communications system exchanging fault management and/or performance management related data.

Figure 1:
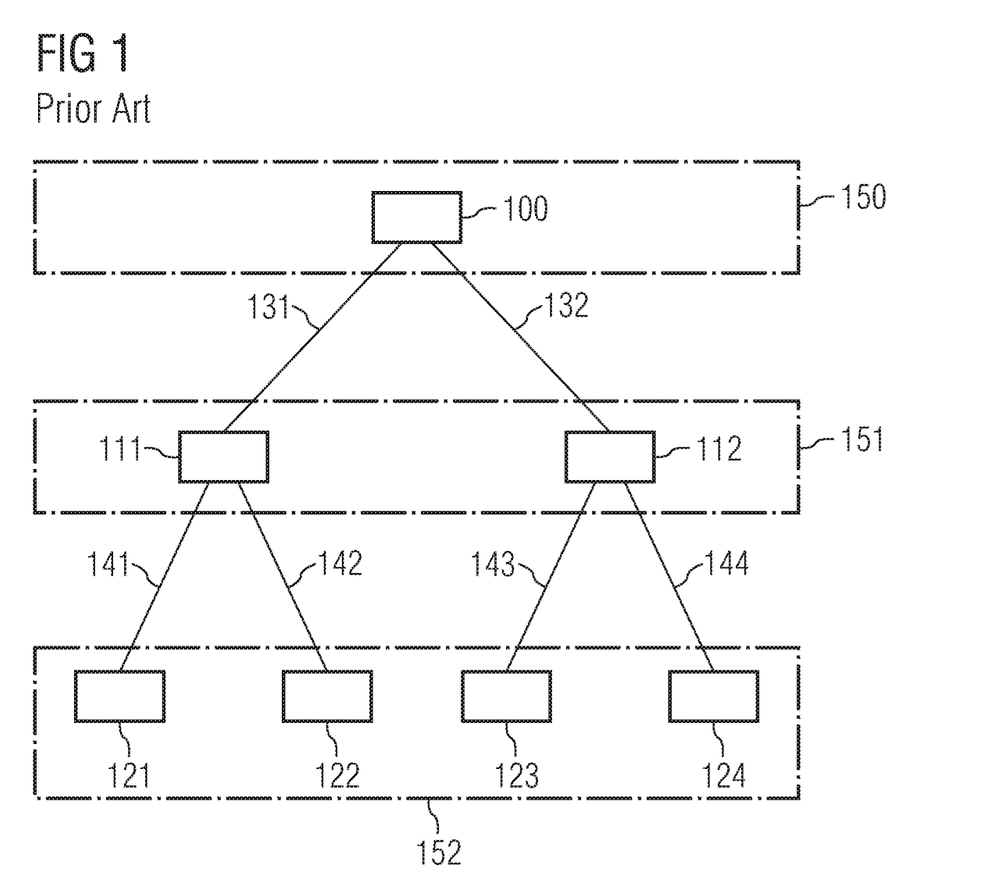
FIG. 1 is a block diagram of a known OAM system in a communications system in which a known FM and/or PM is implemented.

According to the principles of a network management system, a typical management of a communications system, for example, of a telecommunications system, has several hierarchical levels for the management of the communications system. Hierarchical level of a management network means that every level in the management network of the communications system has a certain management and/or communications system related functionality specific for this level, and that, depending on its hierarchical position in the network, it performs a certain management function. Each of these hierarchical levels, with the exception to the top level and the first-line level, has a double management function—manager function and agent function. Each hierarchical level, with the exception of the first-line level, has a manager function with regard to the underlying level, and every hierarchical level, with the exception of the top level, has an agent function with regard to the level before. Thus, management of a communications system features a hierarchical structure clearly defining the functions at every hierarchical level of this communications system or of the management network of the communications system respectively. See an example provided in FIG. 1 representing three levels of a hierarchical management structure in a telecommunications system and described below.

Each level has corresponding entities or elements being of physical and/or abstract nature. Thus, an entity of a hierarchical level can be a software and/or hardware (device) in a communications system. In the following, such entities or elements will be referred to as "network entities". Depending on the level of the management network performing a functionality of a manager or an agent, or both, these network entities are managers, agents, or both. In the following, the terms manager or agent will be used in dependence of the functionality of the corresponding hierarchical level and, thus, in dependence of the corresponding network entity of this hierarchical level. For this reason, if a level represents both the management and the agent level, a network entity in this hierarchical level will be a manager or an agent depending on the function to be performed in a given moment by this network entity.

Network management as such refers to the Operation, Administration, and Maintenance (OAM) of communications systems or networks like telecommunications networks at the top level. Network management is the execution of a variety of functions required for controlling, planning, allocating, deploying, coordinating, and/or monitoring the resources of a network, including performing functions such as initial network planning, frequency allocation, predetermined traffic routing to support load balancing, cryptographic key distribution authorization, configuration management, fault management, security management, performance management, bandwidth management, and/or accounting management. Further, in such a management system hardware and/or software are provided that support OAM functionality and provide these functions, for example, to network users and/or administrators. Thus, OAM includes facilities for operating, managing and maintaining networks.

Managers in a communications system are configured to start operations for the operation, administration and maintenance of the communications network including configuration, fault and/or performance management (CM, FM, and/or PM) of the communications system, for example, as mentioned above. It is done by sending requests, which are performed by the agents, in particular, by the agents assigned to the corresponding managers. The managers receive then corresponding feedbacks, called responses, from the agents.

Network entities implementing the functionality of an agent in the communications network recognize events relevant for the operation, administration and maintenance of the communications network (e.g. alarms), generate corresponding notifications, and transmit these notifications, usually as event reports, to the managers, in particular, to the managers the network entities are assigned to. Thus, an efficient network management is enabled.

The provision of OAM functionality like CM, FM and/or PM, for example, is assured by communication between the hierarchical levels of the management network of the communications system, wherein the network entities of an upper level manage the network entities of the underlying level to ensure a correct performance of the OAM functionality and the managed network entities act depending on the management of the upper management level. Further, in the management network of the communications system a strict assignment exists between managers and agents. A manager has a certain set of agents it has to manage. Agents, in turn, are assigned to one manager. Thus, the performance and safeguarding of the OAM functionality is done in a strict hierarchical way between the levels of the management network of the communications system.

Configuration Management (CM) serves the purpose of making whole networked and distributed system available, while FM and PM keeps the system operational, or restores an operational state. The most important CM tasks are inventorizing or checking and noting configurations and/or distribution of (hardware and/or software) entities, elements, and/or components of a communications system; and appropriate management to ascertain the changes applied by communications system (hardware and/or software) entity, element, and/or component distribution, and where appropriate to implement a corresponding reconfiguration. Additionally, CM is also responsible for installation of documentation and directory services.

Fault Management (FM) includes functions for detecting, isolating, and correcting malfunctions in a (tele-) communications network. FM and its functions compensate for environmental changes, and include maintaining and examining error logs, accepting and acting on error detection notifications, tracing and identifying faults, carrying out sequences of diagnostics tests, correcting faults, reporting error conditions, and localizing and tracing faults by examining and manipulating database information. Thus, when a fault or another FM related event, any causing initiation or implementation of at least one FM related function, occurs, a network component will often send a notification to the network operator using a protocol, such as SNMP for example. An alarm is a persistent indication of a fault that clears only when the triggering condition has been resolved.

Performance Management (PM), in turn, records the system load and displays performance bottlenecks and has a direct influence on network deployment, network extensions and error management. Parameters such as the response time, round trip time, and delay time are important for PM, as are the theoretical performance limits and network load. These parameters are influenced by a number of transmission characteristics such as flow control, access method, attenuation or packet loss rates. PM allows operators to monitor network load and detect performance trends for future network planning. Thus, when a performance bottleneck of another PM related event occurs in the communications system, at least one PM related function is then performed.

The communication between the hierarchical levels of a management network of a communications system and thus between the managers and the agents is usually facilitated by management interfaces, called OAM interfaces. The implementation of these interfaces can be preformed, for example, by appliance of protocols like Simple Network Management Protocol (SNMP), Transaction Language 1 (TL1), Extensible Markup Language (XML), or Common Object Request Broker Architecture (CORBA).

When managing network entities of the first-line level or one of the upper levels, due to hierarchical character of the management structure, this management is performed by at least one of the upper levels via OAM systems and/or corresponding OAM interfaces respectively. Thus, to maintain consistency of the communications network, typical OAM functions like CM, FM and/or PM, for example, concerning the network entities of the first-line level or one of the upper levels are performed by the network entities of the upper levels, wherein a well coordinated information post processing and correlation has to be performed by the corresponding managers and a well coordination of the responsible managers has to be done. To ensure a stable and errorless performance of OAM functions like FM and/or PM, for example, often human network operators have to be involved into the management processes. In such cases, a human network operator has to be able to manage and overlook a variety of data concerning a variety of network entities. Thereby, the known implementation of OAM functions like FM and/or PM, for example, requires a frequent intervention and a regular monitoring and control by human operators being a very complex task. Thus, known implementation of OAM functions like FM and/or PM has the disadvantage of a low degree of automation.

Further, an OAM system with known implementation of OAM functions like FM and/or PM, for example, has large processing requirements, as a large number of alarms and high amount of further OAM functionality relevant or related data (like FM and/or PM related data) has to be exchanged. This heavy data traffic, in turn, causes requirements of high network bandwidth.

As already outlined above, a known OAM system responsible for FM and/or PM of the communications system, for example, is designed by several hierarchical levels of a management network of a communications system, for example, of a telecommunications system. FIG. 1 represents three hierarchical levels of such a management network of a telecommunications system.

In the following, FM and/or PM being important and typical OAM functions will be regarded in more detail.

As already outlined above, the FM and/or PM is performed by providing FM and/or PM related data from the lower levels to the upper levels, where FM and/or PM relevant or related decisions are made, and results of these decisions are then transmitted from the upper levels back to the lower levels.

At the first line level 152, the management network of a telecommunications system has network elements (NEs) 121, 122, 123, and 124. In the following, this hierarchical level 152 will be referred to as the "NE level". A network element (NE) 121, 122, 123, 124 is a kind of telecommunications (hardware) equipment or element that is addressable and manageable. A network element (NE) can also be seen as a combination of hardware and software or a network entity formed of software that primarily performs telecommunications service functions or predefined and a priori agreed upon functions and, thus, provides support or services to users, for example. NEs 121, 122, 123, 124 are interconnected and managed through at least one Element Manager System (EMS) 111, 112 in the upper management level 151, which will be referred to as the "EMS level" in the following. The NE level 152 performs the agent functionality, and the EMS level 151, in turn, performs a manager functionality with regard to the NE level 152 and an agent functionality with regard to the upper level 150 in the hierarchy of the management network.

An EMS 111, 112 is a manager of one or more of a specific type of NEs 121, 122, 123, 124 and allows to manage all the features of each NE 121, 122, 123, 124 individually. Each of the NEs 121, 122, 123, 124 is connected to one responsible and managing EMS 111, 112 via appropriate links. The communication between the NE level 152 and the EMS level 151 and thus between the NEs 121, 122, 123, 124 and the EMS 111, 112 is ensured by management interfaces 141, 142, 143, 144, like EMS/NE Operation and Maintenance (OAM) interfaces, implemented on the links between the NE and EMS level 152, 151. Such connections between the EMS and NEs are called also "southbound" connections.

EMS 111, 112, in turn, are managed by an Operations Support System (OSS) 100 of the top level 150, in the following referred to as the "OSS level". The OSS 100 monitors the underlying management layers 151, 152 and predominantly looks at functional and nonfunctional requirements of the communications system and of the underlying layers 131, 132. The OSS level 150 performs just a manager function with regard to the underlying EMS level 151. The communication between the OSS level 150 and the EMS level 151 or the OSS 100 and the EMS 111, 112 respectively is enabled by links between the two levels, wherein management interfaces 131, 132, for example EMS/OAM interfaces, are implemented on these links for this purpose. The connections or links between the OSS level 150 and EMS level 151 are also known as "northbound" connections.

The NE level 152 or the NEs 121, 122, 123, 124 there and OSS level 150 or the OSS 100 there, monitor permanently the system performance of a live network. When problems occur countermeasures have to be taken in order to maintain the quality of service (QoS) at acceptable levels. In the systems operating conventionally, this process involves transferring data across numerous (vertical) interfaces between hierarchical systems. In addition to this, the process is not automated from an operator's point of view. Either the operator has to initiate corrective actions manually or provide himself a system to assist him in this task.

Figure 2A:
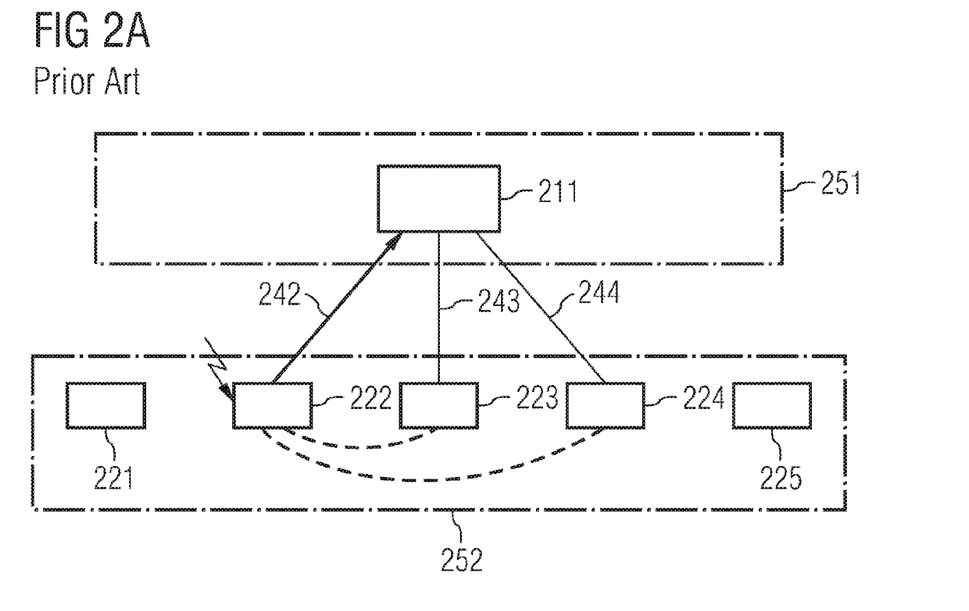
FIG. 2 is a block diagram of a known implementation of FM and/or PM in a communications system.

Procedural examples for FM and/or PM as performed in a known system are shown in FIGS. 2 and 3. In FIG. 2, two management levels, the NE level 252 and the EMS level 251, are shown. The network entities 221, 222, 223, 224, and 225 represent the NEs in the NE level 252, and the network entity 211 represents an EMS in the EMS level 251. In FIG. 2a, a FM and/or PM related event like a fault (represented by a lightning) occurs at the NE 222. This event may cause initiation or implementation of at least one FM and/or PM related function in the corresponding communications system or at the NE 222 respectively. Thus, as a consequence, the NE 222 sends FM and/or PM related data, here an alarm, to its EMS 211, wherein the sending of the alarm is shown with a bold arrow leading to the EMS 211. NEs 223 and 224 have dependencies on NE 222 or relevant configuration management relationships with NE 222 respectively (shown as dashed lines between NE 222 and the NEs 223, 224).

Figure 2B:
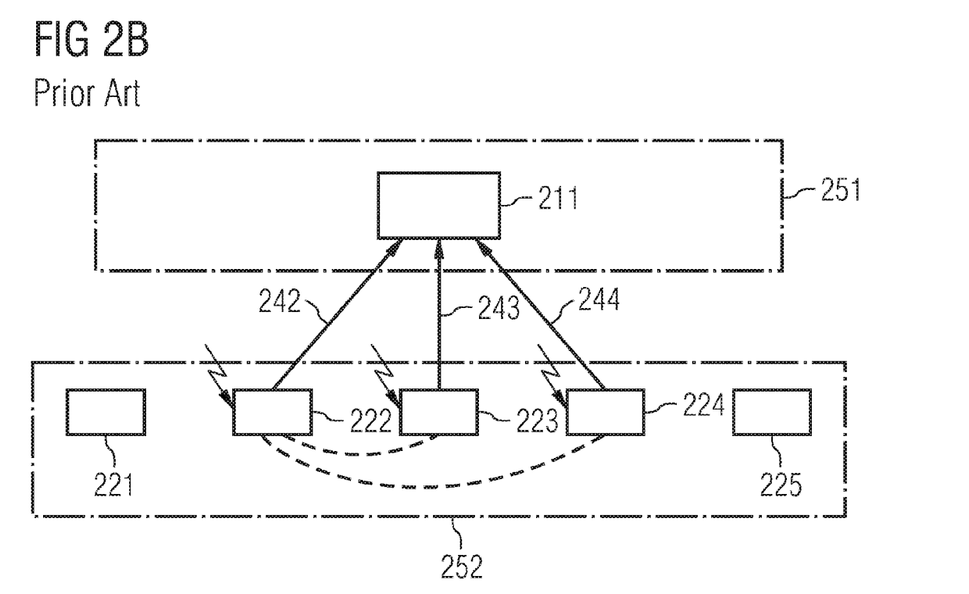

Because of the dependencies or relevant configuration management relationships respectively, as shown in FIG. 2b, the NEs 223 and 224 detect a fault (represented by a lightning at NEs 223, 224) at some later point in time. After the detection of the fault, they can then react to this fault (thus, initiate or implement FM and/or PM related functions) and send also FM and/or PM related data, here alarms, similar to the alarm of NE 222, to the EMS 211 managing beside NE 222 also NEs 223 and 224. Also here, the sending of the alarm is shown with a bold arrow leading to the EMS 211.

Further, it has to be noted, that the NEs 221 and 225 have no relevant configuration management relationships (or dependencies) with the NE 222. For this reason, they are not involved in the given configuration process.

If all concerned NEs are managed by the same EMS, as it is the case FIG. 2a, it would be possible to initiate corrective actions in NE 223 and NE 224 upon reception of the alarm from NE 222. However, this is not possible if the concerned NEs are managed by different EMS. This situation is shown in FIG. 3.

In FIG. 3, the management levels of the NE level 352, the EMS level 351, and the OSS level 350 are shown. The network entities 321, 322, 323, 324, and 325 represent the NEs in the NE level 352, the network entities 311 and 312 represent EMS in the EMS level 351, and the network entity 300 is the OSS of the OSS level 350. There, NEs 323 and 324 having CM relationship with (or dependencies on) the NE 322 (shown as dashed lines between NE 322 and the NEs 323, 324) are managed by different EMS 311 and 312.

Figure 3A:
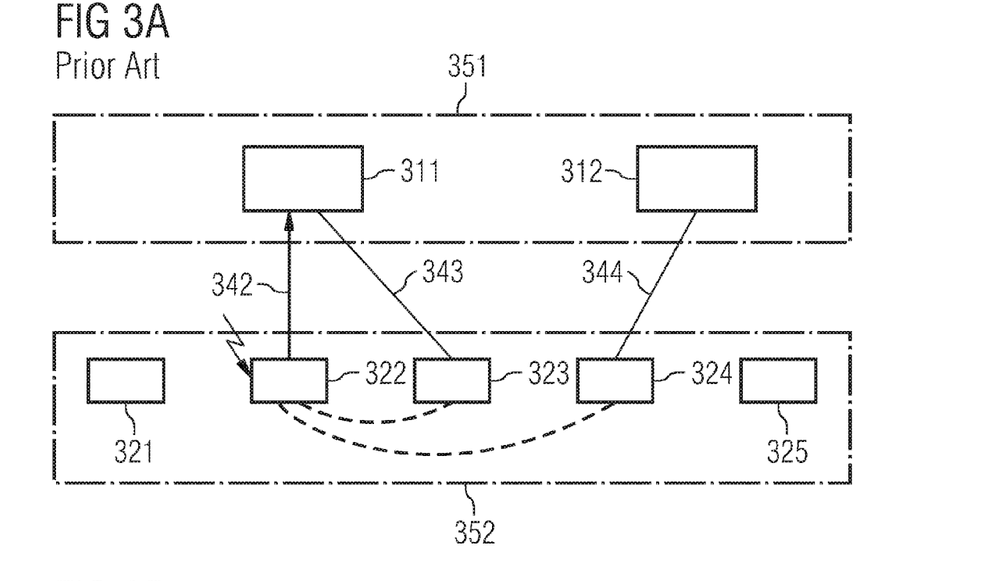
FIG. 3 is a block diagram of a known implementation of FM and/or PM in a communications system.

FIG. 3a shows the situation, when a FM and/or PM related event like a fault (represented by a lightning) occurs at the NE 322. Like the situation in 2a, as a consequence, the NE 322 sends an alarm (FM and/or PM related data) to its managing EMS 311. Also here, the sending of the alarm is shown with a bold arrow leading to the EMS 311.

Figure 3B:
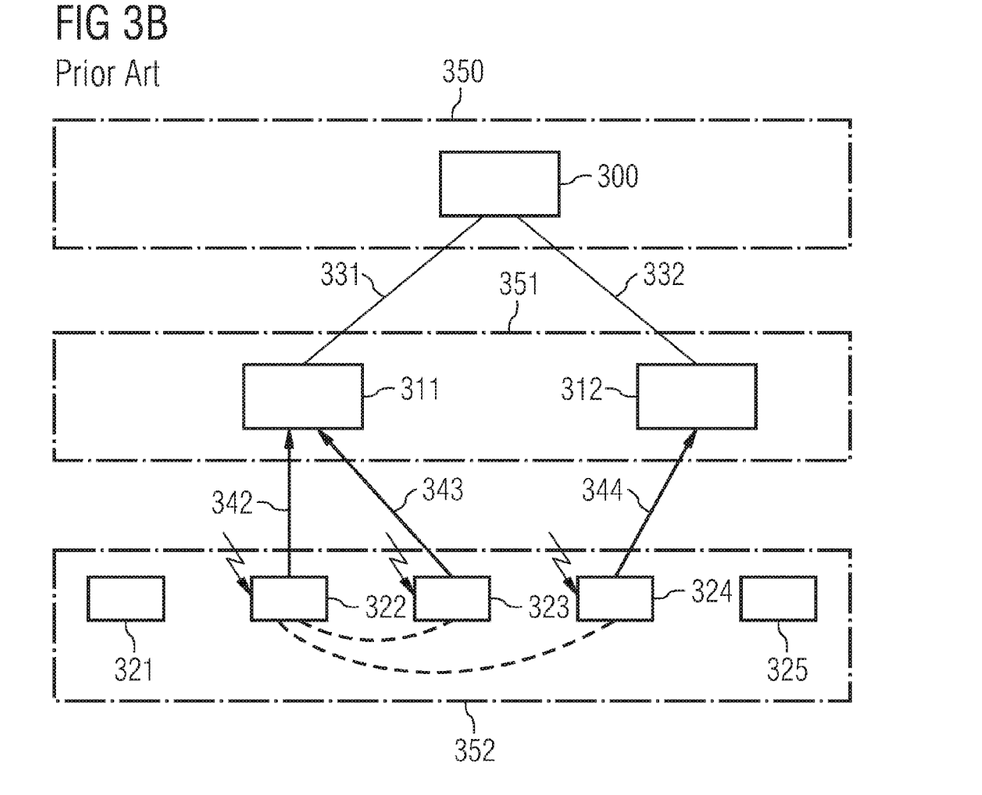

Because of the dependencies or relevant configuration management relationships respectively, the NEs 323 and 324 detect a FM and/or PM related event—a fault (represented by a lightning at NEs 323, 324)—at some later point in time, as shown in FIG. 3b. After the detection of the fault, they can then react to this fault (initiate or implement FM and/or PM related functions) and send alarms, similar to the alarm of NE 322, to their managing EMS 311 and 312. Also here, the sending of an alarm is shown with a bold arrow leading to the EMS 311 or 312.

For an efficient and fast reacting to FM and/or PM related events concerning several NEs and, thus, for an efficient and fast PM and/or FM, wherein a variety of PM and/or FM related functions have to be initiated and/or implemented in the concerning NEs, it is desirable to start corrective actions in NE 323 and NE 324 upon reception of the alarm from NE 322 in a more effective way. However, this is not possible as the concerned NEs are managed by different EMS. In the present case, the EMS 311 and 312 have to provide the fault or configuration related data to the managing OSS 300. This situation is shown in FIG. 3.

Thus, in a known (tele-) communications system, as presented by FIG. 1, the stable and errorless operating of network entities of a communications system important for well functioning FM and/or PM is assured at the EMS and/or at the OSS level 150, 151. At the EMS level 151, such an operating can be assured only for the NEs managed by the managing EMS, typically the NEs of a single vendor. In FIG. 1, the such an operating of NEs 121, 122 is assured by the EMS 111, and the stable and errorless operating of NEs 123, 124 is assured by the EMS 112. At the OSS level 150, in turn, the FM and/or PM related operating can be assured between NEs attached to different EMS. In FIG. 1, this FM and/or PM related operating of NEs 121, 122, 123, and 124 attached to the EMS 111 and 112 is assured by the OMS 110.

Thus, when considering the known implementation of FM and/or PM, the FM and/or PM related data like alarms is always sent by an NE to the managing EMS. The managing EMS, in turn, forwards this data (e.g. alarms) to the corresponding managing OSS, where the alarms (FM and/or PM related data) are post processed and also correlated with further FM and/or PM related data in order to find the root cause. After doing so, the system or operator may react to the network problems. In most cases this is a reconfiguration of the network in order to restore/assure a certain QoS.

Operating in this way the known systems provide following disadvantages: All FM and/or PM related data has to be transferred to a higher level (network management (NM), OSS). This requires high bandwidth and processing power. Further, such a management implementation is slow and does not allow for a fast reaction to network problems, and leads to the known implications like reduced QoS, customer satisfaction decreases, etc. Furthermore, such an management process is typically not automated. The operator has to analyze the data by himself and also take corrective actions by himself. This task may be assisted of course by some applications, but these applications then have to be provided by the operator or a systems integrator. These parties typically do not have the in-depth knowledge of the different NEs required to fully exploit the FM, and/or PM correlation. Thus, the process is error-prone because some correlation is lost when data is being passed upwards from the NE to EMS to NM and then to the OSS. Additionally, such an implementation does not effective use all resources of a communications system. Thus, for example, available direct interfaces between NE (e.g., in third-generation (3G) Long Term Evolution (LTE) and/or between EMS are not exploited.

One way would be exploiting the direct interfaces between the network entities of an agent level like NEs or EMS, for example, by sending the corresponding network FM and/or PM related data between the NEs or EMS directly via these interfaces. Here, it has to be noted that between NEs and EMS direct communications links exist, which are used to carrying only traffic related to call processing. In such a case, communications links responsible for call processing could be used. Thus, upon reception of an alarm the NEs could take actions in order to minimize the performance impact of the alarmed NE on other NEs. However, a problem is that for call processing purposes a NE (or EMS) is connected to numerous other NEs (or EMS). Thus, a NE (or EMS) would send alarms to all NEs (or EMS) to which a physical or logical communications link does exist. Thus, this way would again provide the above disadvantages of high bandwidth and processing power, slow reconfiguration process, etc.

SUMMARY

It is an aspect to improve the operation and maintenance functionality in a communications system.

This aspect is achieved by providing a method of operating network entities in a communications system, wherein the network entities are in one hierarchical level of a management network of the communications system, wherein fault and/or performance relevant or related data is sent with a first (or sending) network entity being one of the network entities to at least one second network entity of the network entities, and wherein the at least one second (or receiving) network entity is determined based on a configuration management relationship with the first network entity.

Further, this aspect is achieved by providing a computer program that when executed performs the method outlined above, this computer program being embodied in at least one computer-readable medium.

Furthermore, this aspect is achieved by providing a network entity in one hierarchical level of a management network of a communications system, wherein the network entity is configured to send fault and/or performance related data to at least one further network entity in the one hierarchical level of the management network of the communications system, and wherein the network entity is configured to determine the at least one further network entity based on a configuration management relationship with the network entity.

Additionally, this aspect is achieved by providing a network entity in one hierarchical level of a management network of a communications system, wherein the network entity is configured to receive fault and/or performance related data from a further network entity in the one hierarchical level of the management network of the communications system.

When determining to which network entities the FM and/or PM related data has to be sent, information about interacting network entities of one hierarchical level (like EMS level or NE level, for example) of a management network of a communications system is derived from CM data in the area of FM and/or PM and used for the determining. The network entities to which the FM and/or PM related data has to be sent are thus entities interacting with the sending network entity in this hierarchical level generally or with regard to a certain configuration management relationship or functionality. Here, introducing of further criteria based on certain parameters or conditions is also possible and will be for the person skilled in the art when implementing the method. Additionally, such a CM relationship serving as basis for the above outlined determination may be based, e.g., on geographical or topological information.

In the CM area data sets have to be configured consistently in different network entities (e.g. NEs or EMS). A CM relationship between these data sets can be classified, for example, into the following two types: master-slave-relationships and peer-to-peer-relationships.

The master-slave design or relationship organizes and distributes tasks between super ordinate and subordinate processing entities in a communications system. This kind of design is always used when one processing entity handles control and task distribution for an another entity. The super ordinate processing entity acts then as a master entity, often having its own operating system, more intelligence, and a bigger feature-set than the subordinate processing entities, which act as slave entities handling mostly only minor tasks.

A peer is an entity of equal rank. In a communications system, a peer is a network entity with communications capabilities that are equivalent to those of an another network entity. Peer layers occur when corresponding layers of two connected nodes or network entities communicate. Peer-to-peer relationships include, thus, relationships between network entities of equal rank. This means that each network entity being a peer provides functionality and services for other peer entities, and utilizes the functionality and service provided by others.

The logical relationship can be caused by geographical (e.g. adjacent base stations) or topological (e.g. routers which are connected to each other) facts.

An example for CM relationship provided by a master-slave-relationship can be demonstrated by a handover in 3G Mobile Networks. There, for example, a radio network controller or RNC (RNC_A) manages a first cell (CELL_A). CELL_A has a handover relationship or adjacency to a second cell (CELL_B). Cell_B, in turn, is managed by a second network entity, a second RNC (RNC_B). In the present scenario, RNC_A has to mirror a subset of the cell data of CELL_B. The master data set of CELL_B is stored in RNC_B. The relationship between the subset of the data of CELL_B in RNC_A and the cell data of CELL_B in RNC_B is a master-slave relationship, because if cell data of CELL_B in RNC_B is changed all dependent data sets (like the data in RNC_A) have to be changed accordingly. This relationship between RNC_A and RNC_B has a corresponding relationship between the managed objects representing these NEs.

An example for CM relationship provided by a peer-to-peer-relationship can be demonstrated by link termination points. There, two network entities NE_A and NE_B are connected via a communications link. The endpoints of the link (link termination points) are denoted LTP_A and LTP_B. LTP_A and LTP_B have to be configured consistently (e.g. with regard to the bandwidth). If either of the two termination points is changed, the respective other termination point has to be changed as well. Hence, there is a Peer-to-Peer relationship between them. The relationship has a corresponding relationship between the managed objects representing LTP_A an LTP_B. The managed objects are residing in the EMS.

Network entities (e.g. NEs, EMS) being involved in a CM relationship are interacting in the call processing area and are hence dependent on the current functional state of the respective other network entities (e.g. NEs, EMS). The faster a network entity gets this information about the other network entity the faster it can react to it, thereby minimizing the impact on the quality of service.

In an embodiment, network FM and/or PM related data (e.g. alarms, parameters, system diagnostic data) is sent (over the inter-NE communication link or over an interface implemented on the inter-NE communication link, for example) to the network entities being involved in a CM relationship with the sending network entity, wherein all of these entities are in one hierarchical level of the management network of the communications system. Thus, when determining the network entities receiving the FM and/or PM related data, these receiving entities will be the network entities to which the sending entity has the corresponding CM relationship. Further, the network entities exchanging the FM and/or PM related data will be mostly entities capable of performing agent function in the management network. Thus, when considering the management network of FIG. 1, these entities will be NEs in the NE level or EMS in the EMS level, for example.

By operating network entities with regard to FM, and/or PM, wherein CM relationships between these network entities are taken into account, the following advantages are provided. The degree of automation of the whole process becomes considerably higher, as the communications system can decide autonomously, where to send FM and/or PM related data. Thus, no operator action is required. Thus, operating expenses (OPEX) including bandwidth and processing requirements can be reduced.

More particular, the proposed solution provides the advantage that FM and/or PM related data can be transmitted directly between the network entities involved in the at least one relevant configuration management relationship. The known methodology always involves an upload of the FM and/or PM related data into network entities of upper management levels and a subsequent downloading of transmitting of data from the upper management levels to the lower management levels. For this reason, the network bandwidth consumed by the data traffic and the processing requirements of the operation and maintenance of the communications system are reduced.

Additionally, a plug-and-play mechanism can be enabled. Thus, it becomes possible to connect network entities in a conflict-free way, in particular, when providing an appropriate interface or connection design. Thereby, also capital expenditures (CAPEX) can be reduced, being an important feature in a communications network.

Thus, a more flexible and efficient operating of network entities is provided, in particular, with regard to FM and/or PM.

The sending entity will be an entity initiating and/or implementing at least one FM and/or PM related function in the communications system. As already pointed out above, the reason for this can be at least one FM and/or PM related event in the communications system like a fault, change in a communications system, or an event providing at least one effect to the communications system in general and/or with regard to FM and/or PM, for example.

After sending of the FM and/or PM related data by the sending network entity, at least one (further or second) FM and/or PM related function can be initiated and/or implemented by using the FM and/or PM related data at the at least one receiving network entity. Thus, a fast reaction to FM and/or PM related events like changes, faults and/or errors in the communications network can be performed. Mostly, at least one network entity receiving this FM and/or PM related data will be configured or processed based on sending of the FM and/or PM related data.

The FM and/or PM related data can be sent via at least one communications link connecting the sending network entity and at least one further (receiving) network entity. When considering the NE level, inter-NE communications links can be used for this purpose, wherein communications links between NEs that are usually carrying only traffic of the user plane and control plane or, in other words, carrying traffic related to the call processing could be used. The same mechanism can be applied also in the EMS level, there inter-EMS communications links can be used to transmit or send configurations management related data. This provides the advantage of fast and complication less data transfer between the corresponding network entities—the sending network entity and at least one further or second entity having the corresponding configuration management relationship with each other.

According to an embodiment, an interface can be implemented on a communications link and used for the above outlined transmission or sending of the FM and/or PM related data. The use of an interface, to implement the FM and/or PM related data exchange provides the advantage of exchangeability of components, entities, or modules supporting or using an interface predetermined or standardised for a certain task. These components, entities, or modules are configured to support or use the interface and can be exchanged or replaced, if necessary. Thus, a more flexible handling or the exchange of FM and/or PM related data is enabled as the components, entities, or modules are compatible to each other. The components, entities, or modules would be the network entities or communications links, as already described, or even other interfaces integrated in the management network of the communications system and/or involved in CM, FM and/or PM.

Thus, plug-and-play mechanisms can be enabled and CAPEX can be reduced by appropriate use of communications links and/or appropriate interfaces on the communications links for the transmission of FM and/or PM related data.

According to an embodiment, if the configuration management relationship is a master-slave-relationship, and if at least one FM and/or PM related function has to be implemented and/or initiated at or by a master entity, the sending entity is the master entity, and the network entities to which the corresponding data is sent (receiving entities) are slave entities of this master entity.

According to a further embodiment, if the configuration management relationship is a master-slave-relationship, and if at least one FM and/or PM related function has to be implemented and/or initiated at or by a slave entity, the sending entity is the slave entity, and the entity to which the corresponding data is sent is the master entity of the slave entity.

In the master-slave-relationship, at least one FM and/or PM related function will be implemented and/or initiated at or by network entities receiving the FM and/or PM related data from the sending entity if a fault or other change influencing the CM occurs at the sending entity.

In the case of a peer-to-peer-relationship, the sending entity will send data to those network entities, to which the sending entity has the corresponding peer-to-peer-relationship. There, the FM and/or PM related data can sent via at least one communications link connecting the sending entity and the at least one (receiving) network entity being in the corresponding peer-to-peer-relationship with the sending entity. The at least one communications link will then have a first termination point at the sending entity and a second termination point at one of the receiving entities. Usually, the cause for initiating and/or performing of at least one FM and/or PM related function in a peer-to-peer-relationship will be the change of at least one of the termination points of the communications link. In this case, at least one of the termination points will be configured by use of the FM and/or PM related data sent via the at least one communications link.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENTS

Reference will now be made in detail to the preferred embodiments, examples of which are illustrated in the accompanying drawings, wherein like reference numerals refer to like elements throughout.

In the following, when considering the FM and/or PM related data exchange by taking into account CM relationships between network entities, the above introduced CM relationships—master-slave-relationship and peer-to-peer-relationship—will be considered in more detail exemplary. However, a person skilled in the art will be able to implement the method accordingly also for further CM relationships, when considering the embodiments provided below.

FIG. 4 presents an implementation of FM and/or PM in a master-slave-relationship. There, the several management levels as outlined above are shown to show more explicitly the difference between the known implementation of FM and/or PM and the proposed implementation of FM and/or PM according to an embodiment. The level 452 represents the NE level with NEs 421, 422, 423, 424, 425, the level 451 represents the EMS level with EMS 411, 412, 413, and the level 450 represents the OSS level.

According to the present embodiment, the NEs 422, 423, and 424 have a master-slave-relationship to each other, wherein NE 422 is the master entity (pointed out by a thicker frame) and NEs 423 and 424 are slave entities. The master-slave-relationship is outlined by the dashed lines between the NEs 422, 423, and 424. The NEs 421 and 425 being entities of the same hierarchical level are not involved in this master-slave-relationship. In the present embodiment, the entities of the NE level 452 are used, however the same implementation can be done also in an other level (like EMS level 451) being an agent level in a management network of a communications system.

Figure 4A:
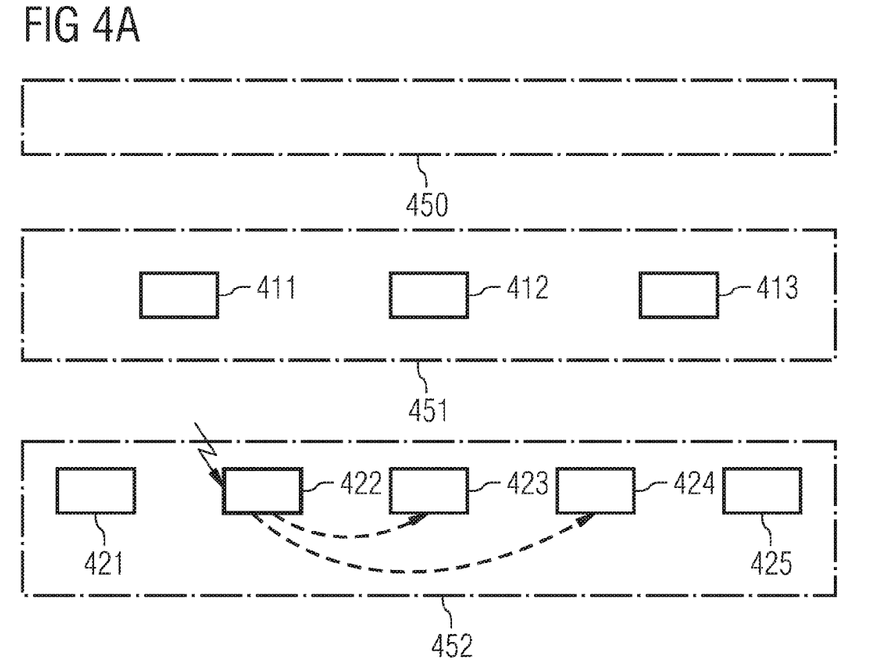
FIG. 4 is a block diagram of an implementation of FM and/or PM in a CM relationship—in a master-slave-relationship.

In FIG. 4a, a situation is shown, when a fault (as representative for a FM and/or PM related event) occurs at a master entity 422 in a master-slave-relationship. In this case, the master entity 422 initiates and/or performs at least one FM and/or PM related function, if necessary, and notifies all slave entities 423, 424 by sending a corresponding FM and/or PM related data. Thus, the slave entities 423, 424 can be processed in an appropriate way very quickly and in a very flexible way, wherein the processing can be performed by initiating and/or implementing at least one (further) FM and/or PM related function.

Figure 4B:
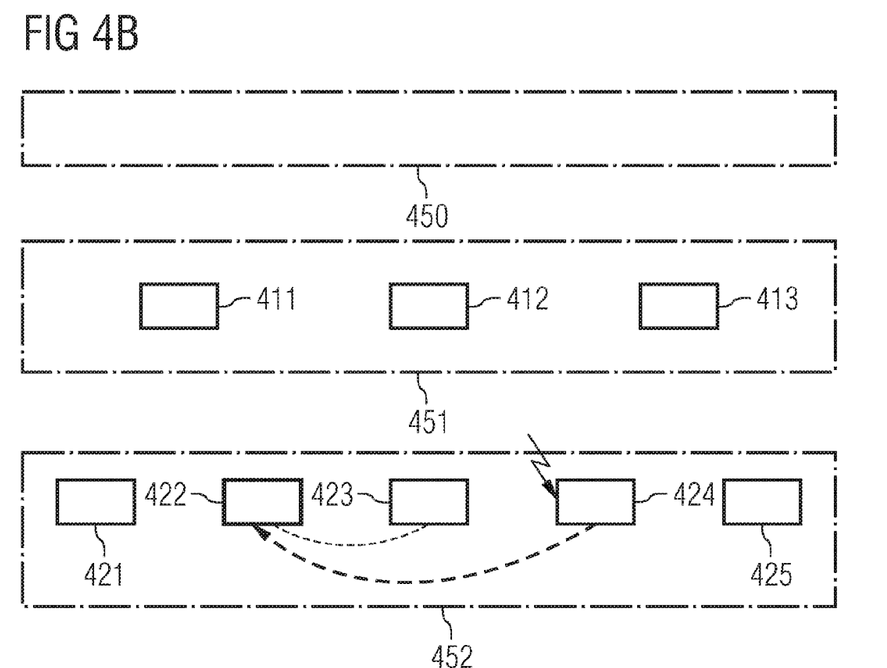

In FIG. 4b, a situation is shown, when a fault (as representative for a FM and/or PM related event) occurs at a slave entity 424 in a master-slave-relationship. In this case, the slave entity 424 initiates and/or performs at least one FM and/or PM related function, if necessary, and notifies its master entity 422 by sending a corresponding FM and/or PM related data. Thus, the master entity 422 will be processed in an appropriate way very quickly and in a very flexible way, wherein also here the processing can be performed by initiating and/or implementing at least one (further) FM and/or PM related function.

When turning back to the master-slave-relationship explained above based on the network entities RNC_A and RNC_B of the cells CELL_A and CELL_B, the implementation of the FM and/or PM according to the embodiment could be as follows. The CELL_B has a problem and goes out of service. RNC_A should initiate no handovers any more from CELL_A to CELL_B. To do so RNC_A has to be informed about the failed CELL_B. This can be done easily by sending the respective alarms from RNC_B to RNC_A via the interface between both RNCs. RNC_B knows that he has to send the alarm to RNC_A from his CM relationships.

Figure 5:
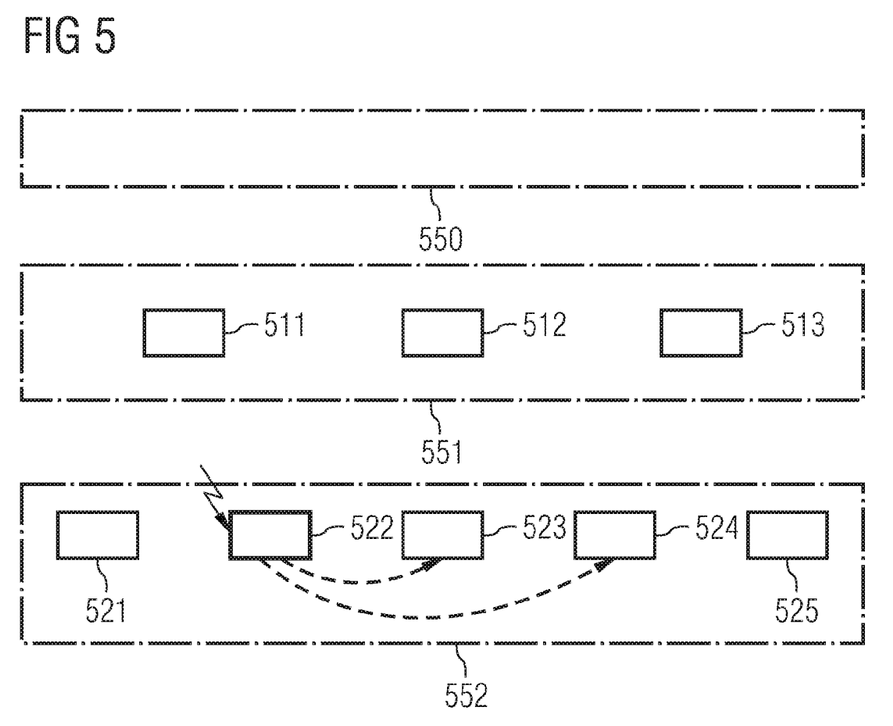
FIG. 5 is a block diagram of an implementation of FM and/or PM in a CM relationship—in a peer-to-peer-relationship.

FIG. 5 presents implementation of FM and/or PM in a peer-to-peer-relationship according to another embodiment. Also in FIG. 5, the several management levels as outlined above are shown to visualize more explicitly the difference between the known implementation of FM and/or PM and the implementation of FM and/or PM. The level 552 represents the NE level with NEs 521, 522, 523, 524, 525, the level 551 represents the EMS level with EMS 511, 512, 513, and the level 550 represents the OSS level.

According to the present embodiment, the NEs 522, 523, and 524 have a Peer-to-Peer-Relationship to each other, pointed out by the dashed lines. The NEs 521 and 525 being entities of the same hierarchical level are not involved in this peer-to-peer-relationship. In the present embodiment, the entities of the NE level 552 are used, however the same implementation can be done also in an other level (like EMS level 551) being an agent level in a management network of a communications system.

If a fault (as representative for a FM and/or PM related event) occurs at network entity 522 in a peer-to-peer-relationship, the network entity 522 initiates and/or performs at least one FM and/or PM related function, if necessary, and notifies the network entities 523, 524 involved in this peer-to-peer-relationship by sending corresponding FM and/or PM related data (e.g. alarm messages). Thus, the network entities 523, 524 can be processed in an appropriate way very quickly and in a very flexible way according to the present embodiment, wherein also here the processing can be performed by initiating and/or implementing at least one (further) FM and/or PM related function.

When turning back to the peer-to-peer-relationship explained above based on the network entities NE_A and NE_B, the implementation of the FM and/or PM could be as follows. NE_B cannot properly provide the link termination point LTP_B any more. From the CM relationship NE_B knows that it is interacting with NE_A and that it could therefore be beneficial to inform NE_A about this problem (in addition to informing the EMS). Thus, NE_B would send appropriate FM and/or PM related data to NE_A directly, and, thus, subsequently a flexible and consistent configuration and/or processing of the corresponding termination points LTP_A and LTP_B would be ensured.

With regard to the above description and embodiments, some more concrete embodiments will be provided. Here, it has to be noted, that a person skilled in the art may readily apply the method also to further more concrete or alternative embodiments, not explained below for the reason of variety of possible concrete cases and situations.

In 3rd Generation Partnership Project (3GPP) a new network architecture is currently being standardized (Long Term Evolution, System Architecture Evolution). This architecture features a direct interface (X2) between the radio base stations called "eNodeBs". The eNodeBs take the handover decisions and require hence information about cells managed by other eNodeBs leading to master-slave-relationships between cell data sets in different eNodeBs. According to the present embodiment, if a first cell managed by a first eNodeBs has a problem and goes out of service, a second eNodeBs managing a second cell being adjacent to the first cell would initiate no handovers to the first cell. This would be done by sending a respective alarm from the first eNodeBs to the second eNodeBs by a direct communications link connecting the first eNodeBs and the second eNodeBs. For the sending purpose, the direct interface X2 (implemented on the direct communications link) could be used.

A further embodiment concerns the current network architecture of 3GPP with an Iur link between different RNCs. There, the Iur link could be used to exchange or send alarms and performance data. The target RNCs would be identified or determined by use of the corresponding CM relationships. Thus, if a problem or fault would occur at a first or sending RNC, the first or sending RNC would send FM and/or PM related data (here, for example, alarms and performance data) to at least one further or receiving RNC via the direct Iur link, wherein the data would be send only to RNCs being involved in the corresponding CM relationship.

The following embodiment concerns the current 3GPP network management architecture with a management interface between element managers or EMS, respectively, in this 3GPP network. Element managers/EMS have knowledge about CM relationships and, thus, are able to exchange alarms and performance data based on this information. Thus, if a fault or an another FM and/or PM related problem or event would occur in a first element manager, the first element manager would send an appropriate FM and/or PM related data (alarms, parameters, for example) just to the element managers involved in the corresponding CM relationship by use of the direct management interface between the element managers.

It is noted that the method is not restricted to the above embodiments but can be applied in connection with any communications system having a management level with several managing levels and in which the operation and maintenance functionality of CM, FM, and/or PM is implemented. The embodiments may thus vary within the scope of the attached claims.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of operating network entities in a communications system, where the network entities are in a first hierarchical level of a management network of the communications system, comprising:
    determining at least one receiving network entity among the network entities to send fault and/or performance management related data, based on a configuration management relationship with a transmitting network entity included in the network entities, the configuration management relationship defining a handover relationship between the transmitting network entity and the receiving network entity used by the network entities to interact with each other for performing a handover operation in respect of a communication, the handover operation being between a first cell and a second cell, the first and second cells being respectively under the control of the transmitting and receiving network entities; and
    sending fault and/or performance management related data from the transmitting network entity to the at least one receiving network entity in order to establish an alternative notification path to provide notification of the fault and/or performance management related data to a manager of the at least one receiving network entity being in a second hierarchical level of the management network higher than the first hierarchical level of the management network via the at least one receiving network entity instead of notification of the fault and/or performance management related data to the manager of the at least one receiving network entity via a manager of the transmitting network entity being in a hierarchical level in common with the manager of the at least one receiving network entity,
    wherein the transmitting network entity initiates at least one first fault and/or performance management related function in the communications system, and the at least one receiving network entity initiates at least one second fault and/or performance management related function using the fault and/or performance management related data received from the transmitting entity via the alternative notification path.

2. The method according to claim 1, wherein said sending of the fault and/or performance management related data is via at least one communications link connecting the transmitting network entity and the at least one receiving network entity.

3. The method according to claim 2, wherein an interface is implemented on the at least one communications link to send the fault and/or performance management related data.

4. The method according to claim 1,
    wherein the configuration management relationship is a master-slave-relationship,
    wherein transmitting network entity is a master entity, and
    wherein the at least one receiving network entity is a slave entity of the master entity.

5. The method according to claim 4, further comprising implementing at least one second fault and/or performance related function at the at least one receiving network entity when a fault occurs at the transmitting network entity.

6. The method according to claim 1,
    wherein the configuration management relationship is a master-slave-relationship,
    wherein the transmitting network entity is a slave entity, and
    wherein the at least one receiving network entity is a master entity of the slave entity.

7. The method according to claim 6, further comprising implementing at least one second fault and/or performance related function at the at least one receiving network entity when a fault occurs at the transmitting network entity.

8. The method according to claim 1,
    wherein the configuration management relationship is a peer-to-peer-relationship, and
    wherein the at least one receiving network entity has a peer-to-peer-relationship with the transmitting network entity.

9. The method according to claim 8,
    wherein the fault and/or performance management related data is sent via at least one communications link connecting the transmitting network entity and the at least one receiving network entity, and wherein the at least one communications link has a first termination point at the transmitting network entity and a second termination point at the at least one receiving network entity.

10. The method according to claim 9, further comprising changing at least one of the first termination point and the second termination point.

11. The method according to claim 10, further comprising configuring at least one of the first termination point and the second termination point using the fault and/or performance management related data sent via the at least one communications link.

12. A network entity in a first hierarchical level of a management network of a communications system having other network entities, comprising:
   at least one processor capable of determining at least one of the other network entities in the one hierarchical level of the management network of the communications system to receive fault and/or performance management related data based on a configuration management relationship therewith, the configuration management relationship defining a handover relationship between the network entity and the at least one other network entity and used by the network entities to interact with each other for performing a handover operation in respect of a communication, the handover operation being between a first cell and a second cell, the first and second cells being respectively under the control of the network entity and the other network entity; and
   a transmitter capable of sending the fault and/or performance management related data to the at least one other network entity in order to establish an alternative notification path to provide notification of the fault and/or performance management related data to a manager of the other network entity being in a second hierarchical level of the management network higher than the first hierarchical level of the management network via the other network entity rather than notification of the fault and/or performance management related data to the manager of the other network entity via a manager of the transmitting network entity being in a hierarchical level in common with the manager of the other network entity,
   wherein the network entity is capable of initiating at least one first fault and/or performance management related function in the communications system by sending the fault and/or performance management related data via the alternative notification path, enabling the at least one other network entity to initiate at least one second fault and/or performance management related function using the fault and/or performance management related data received from the network entity via the alternative notification path.

13. The network entity according to claim 12,
   wherein the configuration management relationship is a master-slave-relationship
   wherein if the network entity is a master entity, the network entity sends the fault and/or performance management related data to at least one slave entity of the network entity, and
   wherein if the network entity is a slave entity, the network entity sends the fault and/or performance management related data to a master entity of the network entity.

14. The network entity according to claim 12,
   wherein the configuration management relationship is a peer-to-peer-relationship, and
   wherein the network entity has the peer-to-peer-relationship with the at least one other of the network entities.

15. The network entity according to claim 14, wherein the network entity sends the fault and/or performance management related data via at least one communications link connecting the network entity and the at least one other of the network entities.

16. The network entity according to claim 15, wherein the network entity sends the fault and/or performance management related data via at least one interface on the at least one communications link.

17. A network entity in a first hierarchical level of a management network of a communications system having at least one other network transmitting entity, comprising:
   a receiver capable of receiving fault and/or performance management related data from the at least one other transmitting network entity in the first hierarchical level of the management network of the communications system, the other transmitting network entity having determined that the network entity is to receive fault and/or performance management related data based on a configuration management relationship between the network entity and the other transmitting network entity, the configuration management relationship defining a handover relationship between the network entity and the other transmitting network entity and used by the network entities to interact with each other for performing a handover operation in respect of a communication, the handover operation being between a first cell and a second cell, the first and second cells being respectively under the control of the network entity and the other transmitting network entity, the other transmitting network entity having determined that the network entity is to receive fault and/or performance management related data based on the configuration management relationship in order to establish an alternative notification path to provide notification of the fault and/or performance management related data to a manager of the network entity being in a second hierarchical level of the management network higher than the first hierarchical level of the management network via the network entity rather than notification of the fault and/or performance management related data to the manager of the network entity via a manager of the other transmitting network entity being in a hierarchical level in common with the manager of the network entity,
   wherein the network entity is capable of receiving the fault and/or performance management related data via the alternative notification path to be used to initiate at least one second fault and/or performance management related function, from the at least one other network entity which is capable of initiating at least one first fault and/or performance management related function by sending the fault and/or performance management related data via the alternative notification path.

18. The network entity according to claim 17, wherein the network entity receives the fault and/or performance management related data via a communications link from the at least one other network entity, the communications link connecting the network entity and the at least one other network entity.

19. The network entity according to claim 18, wherein the network entity receives the fault and/or performance management related data via an interface on the communications link, implemented to transmit the fault and/or performance management related data via the communications link.

20. The network entity according to claim 19, wherein the network entity implements at least one second fault and/or performance management related function using the fault and/or performance management related data.

21. At least one non-transitory computer-readable medium embodying a computer program which execution, by at least one of a plurality of network entities in a first hierarchical level of a management network of a communications system, comprises:

determining at least one receiving network entity among the network entities to send fault and/or performance management related data, based on a configuration management relationship with a transmitting network entity included in the network entities, the configuration management relationship defining a handover relationship between the transmitting network entity and the receiving network entity used by the network entities to interact with each other for performing a handover operation in respect of a communication, the handover operation being between a first cell an a second cell, the first and second cells being respectively under the control of the transmitting and receiving network entities; and sending fault and/or performance management related data from the transmitting network entity to the receiving network entity in order to establish an alternative notification path to provide notification of the fault and/or performance management related data to a manager of the at least one receiving network entity being in a second hierarchical level of the management network higher than the first hierarchical level of the management network via the at least one receiving network entity rather than notification of the fault and/or performance management related data to the manager of the at least one receiving network entity via a manager of the transmitting network entity being in a hierarchical level in common with the manager of the at least one receiving network entity, wherein the transmitting network entity initiates at least one first fault and/or performance management related function in the communications system, and the at least one receiving network entity initiates at least one second fault and/or performance management related function using the fault and/or performance management related data received from the transmitting entity via the alternative notification path.

22. A method of operating network entities in a communications system, where the network entities are in one hierarchical level of a management network of the communications system, comprising:

determining at least one receiving network entity among the network entities to send fault and/or performance management related data, based on a configuration management relationship with a transmitting network entity included in the network entities, the configuration management relationship defining handover relationship between the transmitting network entity and the receiving network entity used by the network entities to interact with each other for performing a handover operation in respect of a communication, the handover operation being between a first cell and a second cell, the first and second cells being respectively under the control of the transmitting and receiving network entities;

establishing according to the determining an alternative notification path to provide the fault and/or performance management related data to a manager of the at leas one receiving network entity being in a second hierarchical level of the management network higher than the first hierarchical level of the management network via the at least one receiving network entity instead of notification of the fault and/or performance management related data to the manager of the at least one receiving network entity via a manager of the transmitting network entity being in a hierarchical level in common with the manager of the at least one receiving network entity; and initiating by the transmitting network entity at least one first fault and/or performance management related function in the communications system, and sending the fault and/or performance management related data via the alternative notification path to enable the at least one receiving network entity to initiate at least one second fault and/or performance management related function.

* * * * *

UNITED STATES PATENT AND TRADEMARK OFFICE
CERTIFICATE OF CORRECTION

PATENT NO. : 8,514,725 B2
APPLICATION NO. : 12/449056
DATED : August 20, 2013
INVENTOR(S) : Juergen Goerge et al.

Page 1 of 1

It is certified that error appears in the above-identified patent and that said Letters Patent is hereby corrected as shown below:

In the Claims

In Col. 17, Line 18, In Claim 21, delete "an" and insert -- and --, therefor.

In Col. 18, Line 23, In Claim 22, delete "leas" and insert -- least --, therefor.

Signed and Sealed this
Fifth Day of November, 2013

Teresa Stanek Rea
*Deputy Director of the United States Patent and Trademark Office*